US012793169B2

(12) United States Patent
Pech et al.

(10) Patent No.: US 12,793,169 B2
(45) Date of Patent: Nov. 10, 2026

(54) NEURAL PROCESSING UNIT ACCELERATED WARPING FOR AUTOMOTIVE HEADS-UP DISPLAY

(71) Applicant: FCA US LLC, Auburn Hills, MI (US)

(72) Inventors: Esaias Pech, Rochester, MI (US); Daniel Cashen, Troy, MI (US); Adinath Jadhav, Bangalore (IN)

(73) Assignee: FCA US LLC, Auburn Hills, MI (US)

( * ) Notice: Subject to any disclaimer, the term of this patent is extended or adjusted under 35 U.S.C. 154(b) by 111 days.

(21) Appl. No.: 18/426,621

(22) Filed: Jan. 30, 2024

(65) Prior Publication Data

US 2025/0245779 A1 Jul. 31, 2025

(51) Int. Cl.
*G06T 3/18* (2024.01)
*B60K 35/23* (2024.01)
*B60K 35/81* (2024.01)

(52) U.S. Cl.
CPC ................ *G06T 3/18* (2024.01); *B60K 35/23* (2024.01); *B60K 35/81* (2024.01)

(58) Field of Classification Search
CPC ............ G06T 3/18; B60K 35/81; B60K 35/23
USPC .......................................................... 345/7–8
See application file for complete search history.

(56) References Cited

U.S. PATENT DOCUMENTS 10,996,481 B1 5/2021 Wells et al.
12,296,684 B2 * 5/2025 Fong ........................ B05D 1/14
2008/0112058 A1 5/2008 Matsushita et al.
2010/0025601 A1 * 2/2010 Francini .............. F04B 39/1013 251/63.6
2010/0292886 A1 * 11/2010 Szczerba ............... G01S 13/723 701/31.4
2019/0199987 A1 * 6/2019 Lessort ................ H04N 9/3141
2022/0066456 A1 * 3/2022 Ebrahimi Afrouzi ........................ G06F 3/04883
2022/0281317 A1 * 9/2022 Ahn ....................... B60K 35/10

FOREIGN PATENT DOCUMENTS

DE 102014213552 B4 * 10/2021 ......... G02B 26/0816
WO 20190234504 A2 12/2019
WO 20190238854 A1 12/2019
WO 20210044741 A1 3/2021

* cited by examiner

*Primary Examiner* — Kwin Xie
(74) *Attorney, Agent, or Firm* — Jeremy J. Klobucar

(57) ABSTRACT

A heads-up display (HUD) system for an automobile includes a projection system configured to project a warped image onto a reflective portion of a surface of a windshield of the automobile, wherein the windshield surface defines a curvature such that the reflected projected warped image appears substantially non-warped to a driver of the automobile and a control system comprising a neural processing unit (NPU) configured to execute a set of machine learning based tasks of the automobile, including obtaining a trained warping model configured for warping an image to obtain the warped image and executing the trained warping model on the image to obtain the warped image, wherein the control system does not utilize a graphical processing unit (GPU) to warp the image or to otherwise obtain the warped image.

18 Claims, 3 Drawing Sheets

NEURAL PROCESSING UNIT ACCELERATED WARPING FOR AUTOMOTIVE HEADS-UP DISPLAY

FIELD

The present application generally relates to automotive heads-up display (HUD) systems and, more particularly, to techniques for neural processing unit (NPU) accelerated warping for an automotive HUD.

BACKGROUND

In automotive applications, a heads-up display (HUD) system includes a portion of a front windshield that is treated or processed in such a way that a projected image will reflect back to a driver of the automobile. Because the windshield has a curvature, the image to be projected is intentionally pre-processed or "warped" such that, after projection onto the curved windshield surface, the reflected image does not appear skewed or otherwise distorted to a driver of the automobile. This warping of the image to be projected is typically performed by a graphical processing unit (GPU) that is designed specifically to handle graphical processing/rendering. As automobiles evolve and add more displays, however, the processing load on the GPU increases, which could require a larger/more expensive GPU or multiple GPUs at increased costs. Accordingly, while such conventional automotive HUD systems do work well for their intended purpose, there exists an opportunity for improvement in the relevant art.

SUMMARY

According to one example aspect of the invention, a heads-up display (HUD) system for an automobile is presented. In one exemplary implementation, the HUD system comprises a projection system configured to project a warped image onto a reflective portion of a surface of a windshield of the automobile, wherein the windshield surface defines a curvature such that the reflected projected warped image appears substantially non-warped to a driver of the automobile and a control system comprising a neural processing unit (NPU) configured to execute a set of machine learning based tasks of the automobile, including obtaining a trained warping model configured for warping an image to obtain the warped image and executing the trained warping model on the image to obtain the warped image, wherein the control system does not utilize a graphical processing unit (GPU) to warp the image or to otherwise obtain the warped image.

In some implementations, the trained warping model defines a warping characteristic function having characteristics that are trained by feeding an untrained warping model with a set of training images and a set of corresponding warped training images. In some implementations, the trained warping model is quantized such that it is executable by the NPU. In some implementations, the set of machine learning tasks executable by the NPU further include autonomous driving and/or advanced driver-assistance (ADAS) system related features of the automobile. In some implementations, the control system is further configured to generate the image based on a set of information to be conveyed to the driver and to provide the image to the NPU.

In some implementations, the set of information includes at least one of a speed of the automobile, a current gear of a transmission of the automobile, and a set of navigation-related information for the automobile. In some implementations, the control system further comprises the GPU, and wherein the GPU is configured to control the projection system to project the warped image. In some implementations, the control system further comprises another central processing unit (CPU) or application-specific integrated circuit (ASIC) configured to generate and provide the image to the NPU and to control the projection system to project the warped image. In some implementations, not utilizing the GPU to warp the image or to otherwise obtain the warped image increases a processing capacity of the GPU such that the GPU is able to handle graphical processing or rendering of other display systems of the automobile.

According to another example aspect of the invention, a method for controlling an HUD system for an automobile is presented. In one exemplary implementation, the method comprises providing a projection system configured to project a warped image onto a reflective portion of a surface of a windshield of the automobile, wherein the windshield surface defines a curvature such that the reflected projected warped image appears substantially non-warped to a driver of the automobile, obtaining, by an NPU of a control system for the HUD system, a trained warping model configured for warping an image to obtain the warped image, wherein the NPU is configured to execute a set of machine learning based tasks of the automobile including executing the trained warping model, and executing the trained warping model on the image to obtain the warped image, wherein the control system does not utilize a GPU to warp the image or to otherwise obtain the warped image.

In some implementations, the trained warping model defines a warping characteristic function having characteristics that are trained by feeding an untrained warping model with a set of training images and a set of corresponding warped training images. In some implementations, the trained warping model is quantized such that it is executable by the NPU. In some implementations, the set of machine learning tasks executable by the NPU further include autonomous driving and/or advanced driver-assistance (ADAS) system related features of the automobile. In some implementations, the method further comprises generating, by the control system, the image based on a set of information to be conveyed to the driver and to provide the image to the NPU.

In some implementations, the set of information includes at least one of a speed of the automobile, a current gear of a transmission of the automobile, and a set of navigation-related information for the automobile. In some implementations, the control system further comprises the GPU, and wherein the GPU is configured to control the projection system to project the warped image In some implementations, the control system further comprises another central processing unit (CPU) or application-specific integrated circuit (ASIC) configured to generate and provide the image to the NPU and to control the projection system to project the warped image. In some implementations, not utilizing the GPU to warp the image or to otherwise obtain the warped image increases a processing capacity of the GPU such that the GPU is able to handle graphical processing or rendering of other display systems of the automobile.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, the warping of the image to be projected in a heads-up display (HUD) system of an automobile is typically performed by a graphical processing unit (GPU) that is designed specifically to handle graphical processing/rendering. As automobiles evolve and add more displays, however, the processing load on the GPU increases, which could require a larger/more expensive GPU or multiple GPUs at increased costs. Accordingly, improved HUD systems and control methods are presented herein. These techniques utilize an existing neural processing unit (NPU) of the automobile to perform machine learning model based warping of the image for projection by the HUD system. The NPU is a separate processor from the GPU and other existing central processing units (CPUs) and the NPU is configured to handle machine learning model execution (e.g., artificial intelligence, or AI processes). NPUs are designed to operate with lower power and latency compared to other processors.

Existing NPUs may be completely unused on lower-level trim models having fewer features and, even at the highest-level, most-equipped trim models, the NPUs still have substantial processing resources available. Thus, by moving the HUD warping task from the GPU to the NPU, processing resources of the GPU are saved without increasing costs. This involves generating and training a special machine learning warping model that produces similar results as the GPU warping function and that can be executed by the NPU. Potential benefits include a reduced processing load on the GPU, which frees the GPU up for graphical processing/rendering of other display systems of the automobile without the need for more costly hardware, as well as lower power consumption via the NPU.

Figure 1:
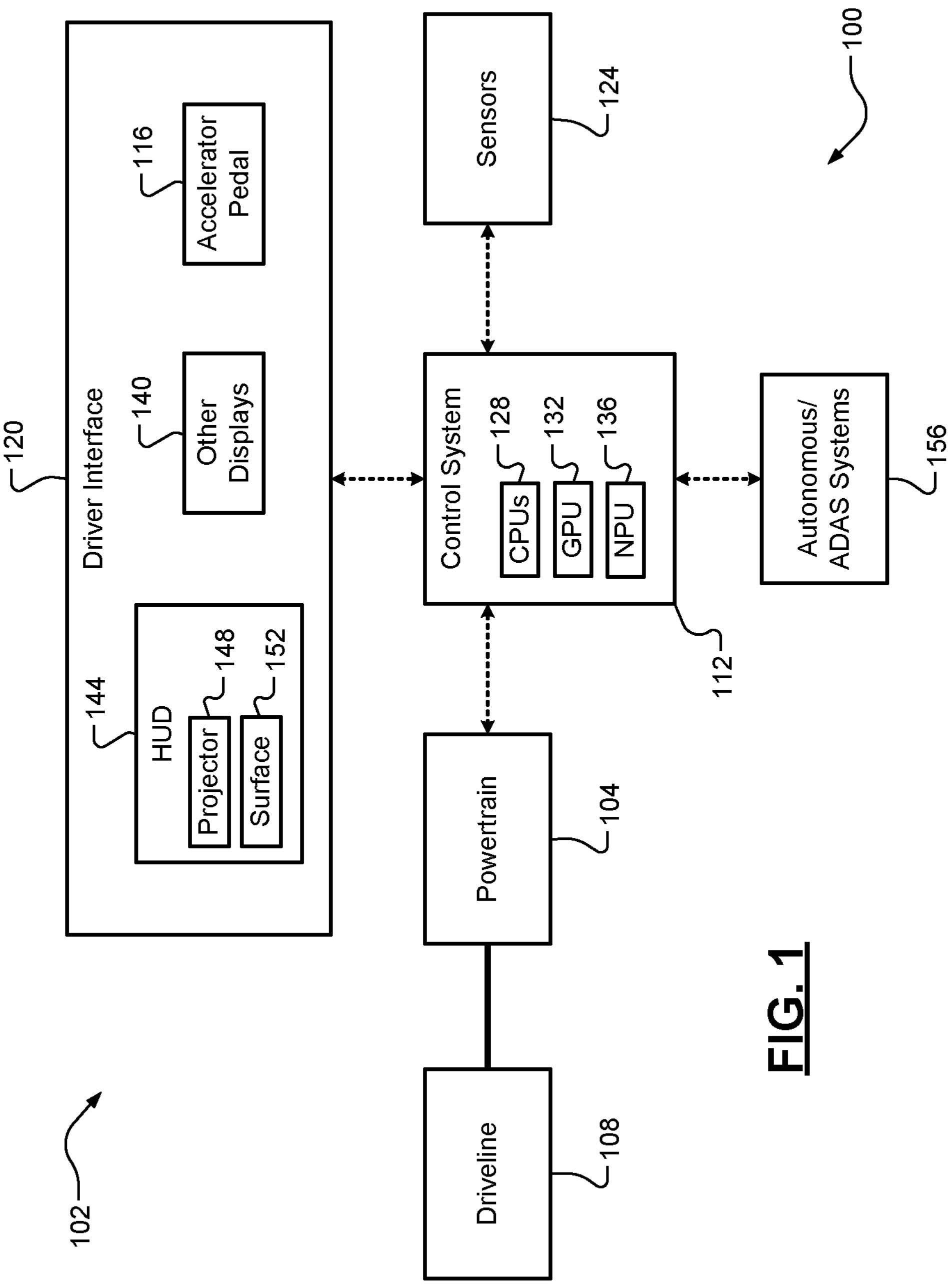
FIG. 1 is a functional block diagram of an automobile having an example heads-up display (HUD) system including a neural processing unit (NPU) according to the principles of the present application.

Referring now to FIG. 1, a functional block diagram of an automobile 100 having an example HUD system 102 according to the principles of the present application is illustrated. The automobile 100 generally comprises a powertrain 104 that is configured to generate and transfer drive torque to a driveline 108 for propulsion. Non-limiting examples of the components of the powertrain 104 include an internal combustion engine, one or more electric motors, and an automatic transmission.

A control system 112 controls operation of the automobile 100, including primarily controlling the powertrain 104 to generate and transfer an amount of drive torque to the driveline 108 to satisfy a torque request provided by a driver of the automobile 100 via an accelerator pedal 116 or other suitable device of a driver interface 120. The control system 112 can perform this control based on measurements from a set of sensors 124 of the automobile 100, which are configured to measure a variety of desired operating parameters (speeds, torques, temperatures, pressures, etc.).

In one exemplary implementation, the control system 112 includes a plurality of application-specific integrated circuits (ASICs) and/or central processing units (CPUs) 128, a GPU 132, and an NPU 136. The control system 112 could include a plurality, for example, of electronic control units (ECUs) that each have their own CPU(s) 128 (an engine control module, a transmission control module, a hybrid control processor, etc.). The GPU 132 and the NPU 136, for example, could both be part of a same system-on-chip (SoC). The GPU 132 is configured to control graphical processing/rendering for human-machine interfaces (HMIs) or images displayed by one or more displays 140 (an infotainment unit, an in-dash or instrument panel cluster (IPC) display, etc.) of the driver interface 120. The driver interface 120 further includes another display—an HUD 144. The HUD 144 includes a projector or projection system 148 and a surface 152 (e.g., a reflective portion of a surface of a curved windshield of the automobile 100).

The automobile 100 also includes one or more autonomous/ADAS systems 156. Non-limiting examples of these systems 156 include adaptive cruise control (ACC), object detection/classification and collision avoidance, and automated lane keeping/centering. The NPU 136 is configured to execute a set of machine learning tasks, most of which are associated with the autonomous/ADAS systems 156. Some trim levels of the automobile 100, however, will have a limited number (or zero) active autonomous/ADAS systems 156. Even the highest trim level (most-equipped) configurations of the automobile 100 still do not have enough machine learning tasks to fully load the NPU 136. Thus, the NPU 136 should have significant processing resources/capacity available to perform the machine learning based image warping techniques of the present application. This task would normally be handled by the GPU 132 and moving this task to the NPU 136 frees up graphical processing/rendering resources or capabilities of the GPU 132, such as for the other displays 140.

Figure 2:
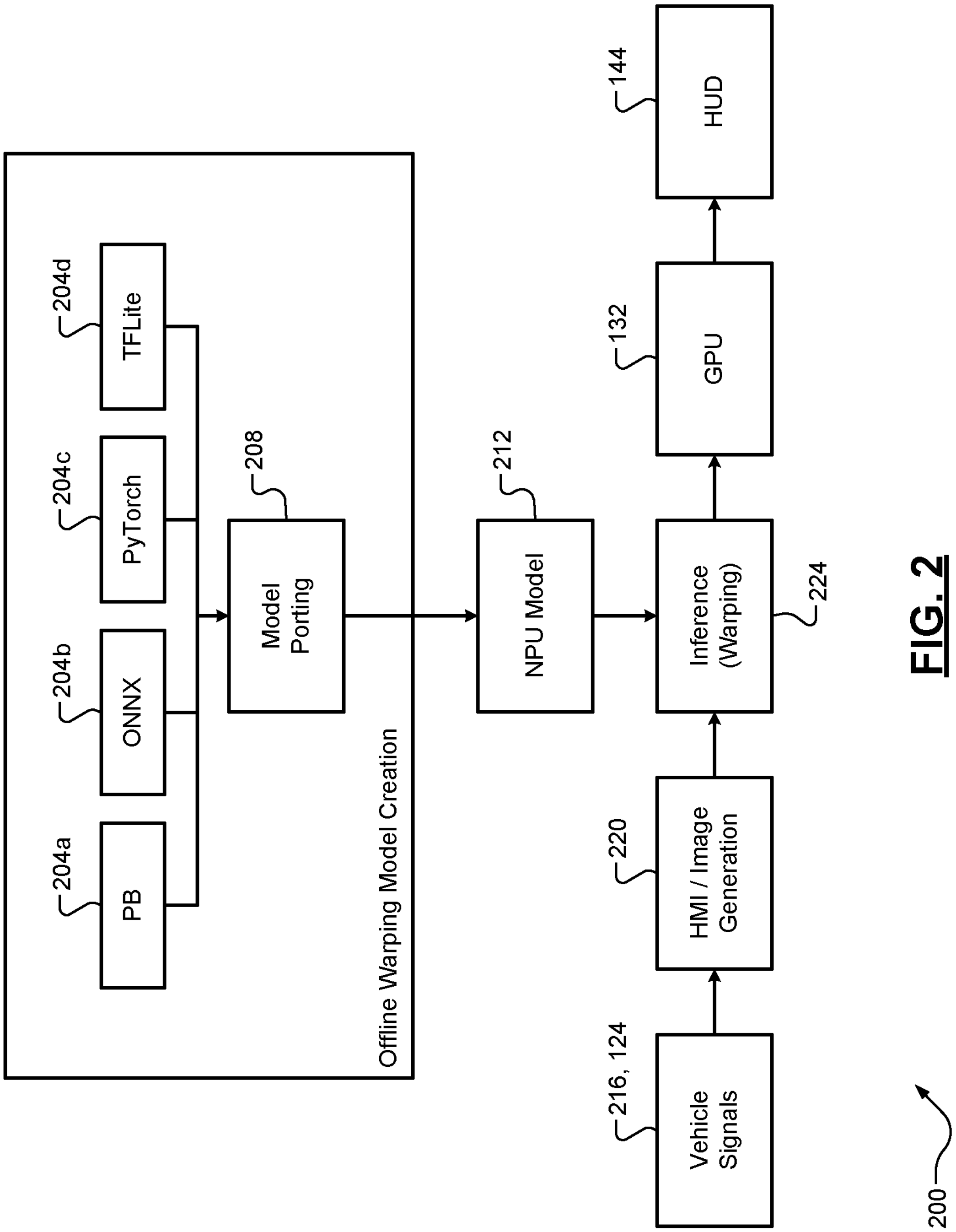
FIG. 2 is a functional block diagram of an example architecture for an NPU accelerated warping based control system for an automobile HUD according to the principles of the present application.

Referring now to FIG. 2, a functional block diagram of an example architecture for the control system 112 (also referred to herein as "control system 200") according to the principles of the present application is illustrated. One of a plurality of different machine learning frameworks/libraries could be utilized to generate and train the warping model. Some examples of these frameworks/libraries 204*a*-204*d* are illustrated and briefly described herein.

A first option is Protocol Buffer (PB) 204*a*, which is a language and platform-neutral extensible mechanism for serializing structured data (e.g., a PB model could be used by the TensorFlow machine learning and artificial intelligence library). A second option is Open Neural Network Exchange (ONNX) is a cross-platform accelerated machine learning framework with built-in optimizations for speeding up training and inferencing. A third option is PyTorch 204*c*, which is an open source machine learning framework based on the Python programming language and the Torch open source machine learning library (used for creating deep neural networks). A fourth option is TensorFlow 208*d*, which is an open source machine learning platform, with TensorFlow Lite ("TFLite") being a faster version of full TensorFlow library. It will be appreciated that these are non-limiting examples and that any suitable machine learning model generation/training framework/libraries could be utilized.

After creation/generation and training, the trained warping model is then ported by model porting block 208 to output the trained model to the NPU 136 for execution thereby. In parallel, vehicle signals 216 (e.g., from sensors 124) are gathered or collected and collectively represent a set of information to be displayed to the driver. This could be a predetermined or predefined set of information or could be customizable by the driver. Non-limiting examples of this information include a speed of the automobile 100, a current gear of the transmission of the powertrain 104, a fuel/battery range of the automobile 100, and navigation-related information (a directional heading, a current road and speed limit, etc.). It will be appreciated that these are merely illustrative examples and that the projected image could include any desirable information.

Using the gathered/collected set of information, an HMI or image is generated at block 220, which includes/depicts the set of information in a desired graphical representation. An inference/warping block 224 receives the HMI or image and the NPU 136 executes the trained warping model thereon to obtain a warped HMI or image. This warped HMI or image is then provided to, for example, the GPU 132 for controlling the projection thereof by the HUD 144. It will be appreciated that the GPU 132 may not be involved and that another portion of the control system 112 (e.g., another ASIC or CPU) could handle the control of the projection of the warped HMI or image by the HUD 140. The control of the projection of the warped HMI or image involves commanding the projector 144 to project the warped image onto the surface 148 (e.g., a reflective portion of a curved windshield surface) of the automobile, which is then viewable by the driver as a non-warped or otherwise skewed/distorted.

Figure 3A:
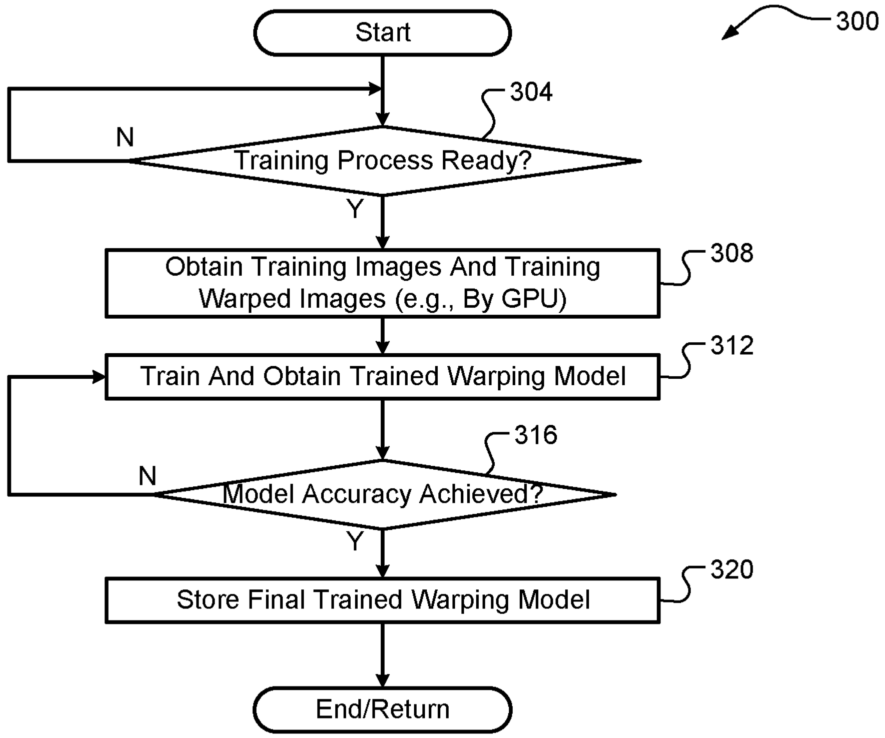
FIGS. 3A-3B are flow diagrams of an example warping model training method and an HUD control method for an automobile that performs NPU-based image warping according to the principles of the present application.
Figure 3B:
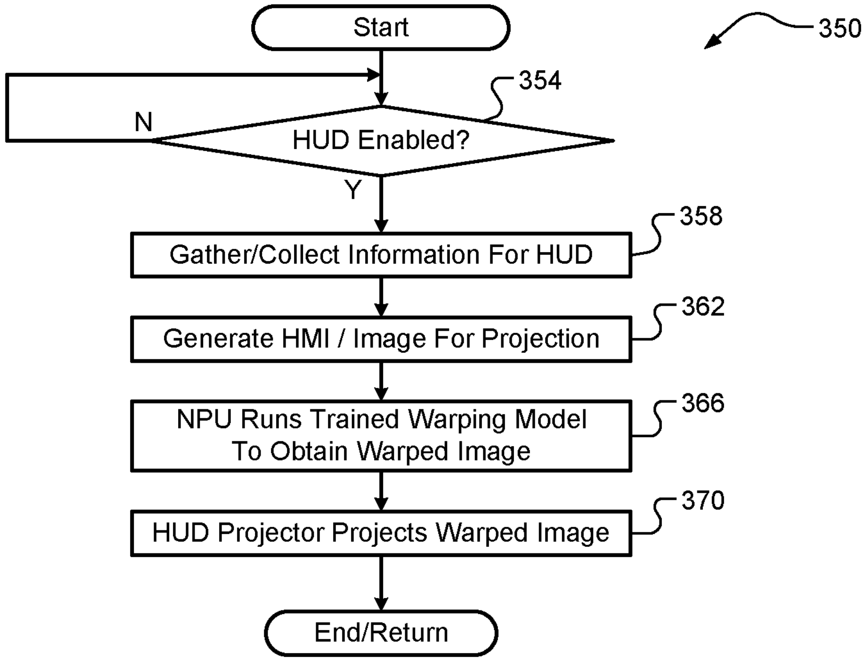

Referring now to FIGS. 3A-3B, flow diagrams of an example warping model training method 300 and an example control method 350 for a HUD system of an automobile that performs NPU-based image warping according to the principles of the present application are illustrated. While the automobile 100 and its components are specifically references for illustrative/descriptive purposes, it will be appreciated that the control method 300 could be applicable to any suitable automobile HUD system or another suitable HUD system (aviation HUD systems, helmet or headwear based HUD systems, etc.).

In FIG. 3A, the first method (the warping model training method) 300 begins at 304. At 304, a computing system (e.g., an offline model generation/training system) determines whether the conditions are ready for training of the warping model. An untrained warping model could be initially created or generated, for example, and training images could be gathered/collected. When false, the method 300 ends or returns to 304. When true, the method 300 proceeds to 308. At 308, the computing system obtains a set of training images and a corresponding set of warped training images to be used for training the untrained warping model.

At 312, the control system 112 trains the untrained warping model, which defines characteristics (e.g., parameters) that need to be characterized or trained. This includes, for example, training/learning these characteristics by feeding the untrained warping model with the set of training images and the corresponding set of warped training images. For example, these warped training images could have been pre-generated by a GPU, such as the GPU 132 or another GPU. This operation 312 continues until, at 316, the trained warping model is capable of producing a desired level of accuracy, after which the final trained warping model is obtained and stored at 320 (e.g., loaded into the control system 112 of the automobile 100). This could also include quantizing the trained warping model based on the capabilities of the NPU 136.

In FIG. 3B, the second method (the NPU-based image warping method) 350 begins at 354. At 354, the control system 112 determines whether the HUD 140 is enabled or activated. When false, the method 350 ends or returns to 354. When true, the method 350 proceeds to 358. At 358, the control system 112 gathers or collects the set of information for the HMI or image to be projected via the HUD 140. As previously discussed, this could include any suitable information to be conveyed to the driver and could be predetermined or predefined or could be driver-customizable. At 362, the control system 112 generates the HMI or image for projection based on the set of information.

At 366, the NPU 136 executes the trained warping model on the HMI or image to obtain a warped HMI or image (hereinafter, "warped image"). This warping process to obtain the warped image does not involve the GPU 132, thereby freeing up the processing resources of the GPU 132 to handle other tasks. At 372, the control system 112 controls the HUD 140 to project the warped image. More specifically, the control system 112 controls the projector 144 to project the warped image onto the surface 148, which appears to the driver as a non-warped image (i.e., not skewed or distorted). The method 350 then ends or returns to 354 or 358.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A heads-up display (HUD) system for an automobile, the HUD system comprising:

a control system comprising a graphical processing unit (GPU) and a neural processing unit; and a projection system configured to project a warped image onto a reflective portion of a surface of a windshield of the automobile, wherein the windshield surface defines a curvature such that the reflected projected warped image appears substantially non-warped to a driver of the automobile;

wherein the NPU is configured to execute a set of machine learning based tasks of the automobile, including:

obtaining a trained warping model configured for warping an image to obtain the warped image; and executing the trained warping model on the image to obtain the warped image, wherein the control system does not utilize the GPU to warp the image or to otherwise obtain the warped image.

2. The HUD system of claim 1, wherein the trained warping model defines a warping characteristic function having characteristics that are trained by feeding an untrained warping model with a set of training images and a set of corresponding warped training images.

3. The HUD system of claim 2, wherein the trained warping model is quantized such that it is executable by the NPU.

4. The HUD system of claim 1, wherein the set of machine learning tasks executable by the NPU further include autonomous driving and/or advanced driver-assistance (ADAS) system related features of the automobile.

5. The HUD system of claim 1, wherein the control system is further configured to generate the image based on a set of information to be conveyed to the driver and to provide the image to the NPU.

6. The HUD system of claim 5, wherein the set of information includes at least one of a speed of the automobile, a current gear of a transmission of the automobile, and a set of navigation-related information for the automobile.

7. The HUD system of claim 5, wherein the GPU is configured to control the projection system to project the warped image.

8. The HUD system of claim 5, wherein the control system further comprises another central processing unit (CPU) or application-specific integrated circuit (ASIC) configured to generate and provide the image to the NPU and to control the projection system to project the warped image.

9. The HUD system of claim 1, wherein not utilizing the GPU to warp the image or to otherwise obtain the warped image increases a processing capacity of the GPU such that the GPU is able to handle graphical processing or rendering of other display systems of the automobile.

10. A method for controlling a heads-up display (HUD) system for an automobile, the method comprising:

providing a control system for the HUD system, wherein the control system comprises a graphical processing unit (GPU) and a neural processing unit (NPU);

providing a projection system configured to project a warped image onto a reflective portion of a surface of a windshield of the automobile, wherein the windshield surface defines a curvature such that the reflected projected warped image appears substantially non-warped to a driver of the automobile;

obtaining, by the NPU, a trained warping model configured for warping an image to obtain the warped image, wherein the NPU is configured to execute a set of machine learning based tasks of the automobile including executing the trained warping model; and executing the trained warping model on the image to obtain the warped image, wherein the control system does not utilize the GPU to warp the image or to otherwise obtain the warped image.

11. The method of claim 10, wherein the trained warping model defines a warping characteristic function having characteristics that are trained by feeding an untrained warping model with a set of training images and a set of corresponding warped training images.

12. The method of claim 11, wherein the trained warping model is quantized such that it is executable by the NPU.

13. The method of claim 10, wherein the set of machine learning tasks executable by the NPU further include autonomous driving and/or advanced driver-assistance (ADAS) system related features of the automobile.

14. The method of claim 10, further comprising generating, by the control system, the image based on a set of information to be conveyed to the driver and to provide the image to the NPU.

15. The method of claim 14, wherein the set of information includes at least one of a speed of the automobile, a current gear of a transmission of the automobile, and a set of navigation-related information for the automobile.

16. The method of claim 14, further comprising controlling, by the GPU, the projection system to project the warped image.

17. The method of claim 14, wherein the control system further comprises another central processing unit (CPU) or application-specific integrated circuit (ASIC) configured to generate and provide the image to the NPU and to control the projection system to project the warped image.

18. The method of claim 10, wherein not utilizing the GPU to warp the image or to otherwise obtain the warped image increases a processing capacity of the GPU such that the GPU is able to handle graphical processing or rendering of other display systems of the automobile.

* * * * *